Oct. 25, 1955 C. L. ISBORN 2,721,947

COUNTING CIRCUIT

Filed May 3, 1954 2 Sheets-Sheet 1

INVENTOR:
Carl L. Isborn
Earl Benst
Louis A. Kline
By John T. Matlago, Agent
His Attorneys Oct. 25, 1955 C. L. ISBORN 2,721,947
COUNTING CIRCUIT
Filed May 3, 1954 2 Sheets-Sheet 2
Fig. 5
| Input Pulses C | Stages $2^0$ A0 Flip-Flop | Stages $2^1$ A1 Flip-Flop | Stages $2^2$ A2 Flip-Flop |
|---|---|---|---|
| | 0 | 0 | 0 |
| 1st | 1 | 0 | 0 |
| 2nd | 0 | 1 | 0 |
| 3rd | 1 | 1 | 0 |
| 4th | 0 | 0 | 1 |
| 5th | 1 | 0 | 1 |
| 6th | 0 | 1 | 1 |
| 7th | 1 | 1 | 1 |
Fig. 6
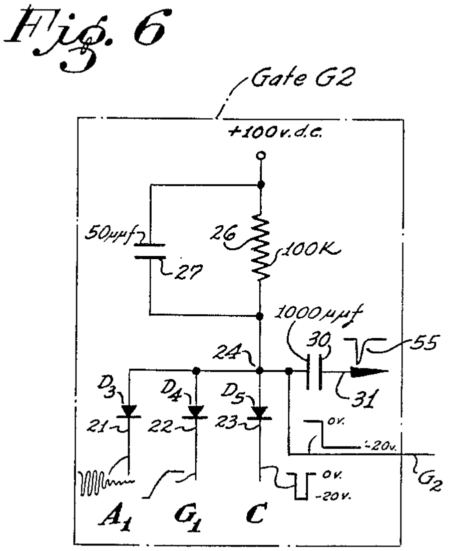
Fig. 7
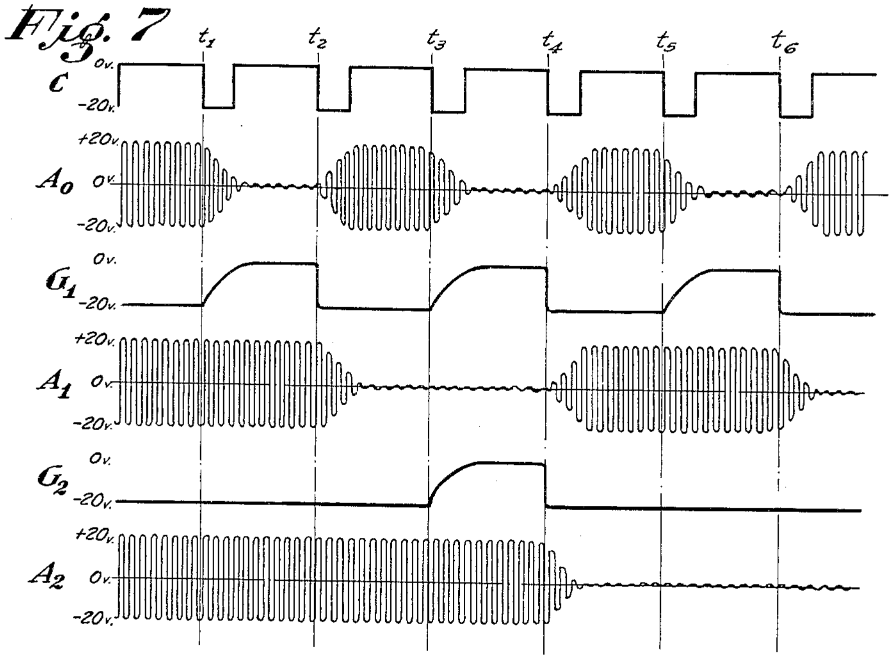
INVENTOR:
Carl L. Isborn
By Earl Beust
Louis A. Kline
John T. Matlago, Agent
His Attorneys 2,721,947
Patented Oct. 25, 1955

2,721,947

COUNTING CIRCUIT

Carl L. Isborn, Richmond, Calif., assignor, by mesne assignments, to The National Cash Register Company, a corporation of Maryland Application May 3, 1954, Serial No. 427,034
6 Claims. (Cl. 307—88)

This invention relates to counting circuits and more particularly to a novel gating arrangement for interconnecting ferro-resonant flip-flop circuits so as to function as a binary counter.

Among the objects of this invention are:

To provide a novel parallel-gated binary counting circuit having low power requirements.

To provide a novel diode gating circuit for interconnecting A. C. operated flip-flop circuits.

To provide a binary counting circuit of relatively simple, economical construction.

Briefly, the present invention comprises an A. C. voltage supply connected across a cascade of ferro-resonant flip-flop circuit stages. Each stage includes a pair of current paths, one of which has a relatively high current conduction, while the other simultaneously has a relatively low current conduction. The current status of the paths of each stage is capable of being reversed on application of a trigger pulse to a single input of the stage. The pulses to be counted are connected directly to the input of the first stage and to the inputs of each of the remaining stages through diode gating circuits. In addition to responding to these pulses, each of these gating circuits also responds to the A. C. output of the previous stage and to the output of the gating circuit coupled to the input of the previous stage. Each gating circuit is arranged such that its inputs are connected by way of the crystal diodes to a common junction which is connected to a positive D. C. voltage source by way of a limiting resistor shunted by a capacitor. This capacitor serves to filter out the A. C. ripple on the gate output caused by the A. C. input. The output of the gate can have either a relatively high or a relatively low D. C. voltage level. The time constant of a coupling capacitor, in the output of the gate, with the limiting resistor, causes a rise to the higher voltage level at the gate output to be gradual. On the other hand, the time constant of this output capacitor with the low resistance of the crystal diode to which the counting pulses are applied causes a fall to the lower voltage level at the gate output to be quite abrupt. The high or low D. C. voltage level taken from each gate is conveyed to the following gate while the abrupt fall in voltage level sensed by the coupling capacitor generates a sharp pulse which is applied to the trigger input of the stage to which the gate output is connected.

These and other features of this invention, as well as additional objects thereof, will become more apparent by reference to the ensuing description and the accompanying drawings in which:

Fig. 5 is a table for explaining the operation of the circuit shown in Fig. 1.

Fig. 6 is a schematic diagram of the diode gating circuit as utilized in the circuit of Fig. 1.

Fig. 7 is a time chart of voltage waveforms explaining the operation of the circuit shown in Fig. 1.

Figure 1:
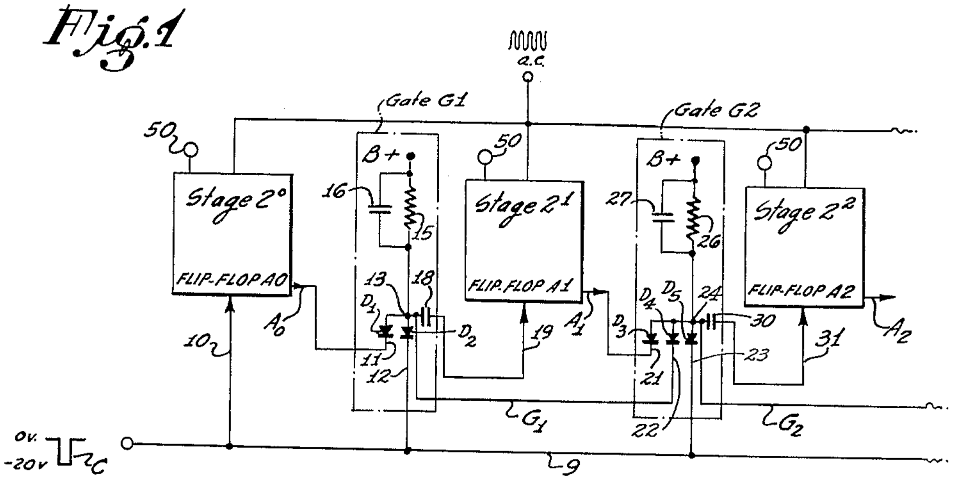
Fig. 1 is a combination block schematic diagram of a preferred embodiment of the binary counter circuit.

Reference will now be made to Fig. 1 wherein the combination block schematic diagram of a preferred embodiment of the invention is presented. There the three stages $2^0$, $2^1$, and $2^2$ of a binary counter, comprised of flip-flops A0, A1, and A2, respectively, are shown. Each stage is connected to the following stage by way of a diode gate. Thus gate G1 connects stage $2^0$ to stage $2^1$, and gate G2 connects stage $2^1$ to stage $2^2$. A common input lead 9 supplies negative square wave pulses C for triggering the stages. The common input lead 9 is connected directly to the trigger input lead 10 of stage $2^0$, and connected to trigger input leads 19 and 31 of stage $2^1$ and stage $2^2$, by way of the gates G1 and G2, respectively.

Diode gate G1 comprises a pair of input leads 11 and 12 having therein crystal diodes $D_1$ and $D_2$, respectively, connected to a common junction 13. Junction 13 is connected to a positive D. C. voltage source B+ by a limiting resistor 15 shunted by a capacitor 16. The diodes $D_1$ and $D_2$ are orientated such that current can flow from source B+ to the lower potential at the gate inputs. Output $A_0$ of the first stage flip-flop A0 is connected to the first input lead 11, and the common input lead 9 is connected to the second input lead 12 of gate G1. The common junction 13 of gate G1 is coupled by way of capacitor 18 to the trigger input lead 19 of stage $2^1$ comprised of flip-flop A1. Gate circuit G2 is arranged similarly to gate circuit G1 with three input leads 21, 22, and 23 having therein crystal diodes $D_3$, $D_4$, and $D_5$, respectively, which are connected to a common junction 24. This junction 24 is connected to the positive D. C. voltage source B+ by a limiting resistor 26 shunted by a capacitor 27. The output $A_1$ of flip-flop A1 is connected to the first input lead 21 of gate G2; the output $G_1$ of gate G1 is connected to the second input lead 22 of gate G2; and the common input lead 9 is connected to the third input lead 23 of gate G2. The common junction 24 of gate G2 is coupled by way of capacitor 30 to the trigger input lead 31 of flip-flop A2. If additional stages are to be provided, they would be connected to the preceding circuits by a three input gate circuit similar to gate G2.

In order to understand the preferred embodiment of the invention, the single input ferro-resonant flip-flop circuit, as used in each stage of the counter, will next be described. It should be noted, however, that these flip-flop circuit arrangements are not intended as part of the teachings of this invention inasmuch as this circuit is shown, described, and claimed in a co-pending application of Carl L. Isborn, entitled "Ferro-Resonant Flip-Flop Circuit," Serial No. 417,625, filed March 22, 1954.

Figures 2, 3, 4:
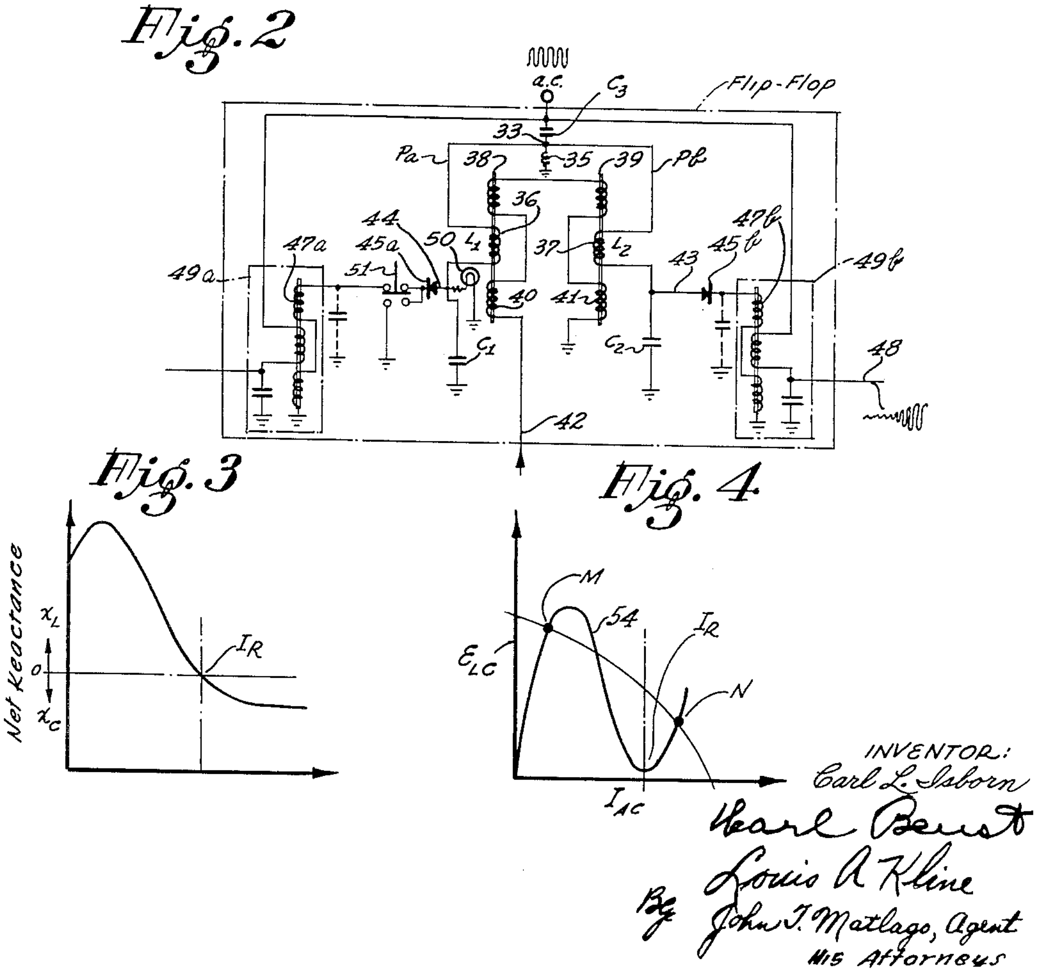
Fig. 2 is a schematic diagram of a single input ferro-resonant flip-flop circuit.
Figs. 3 and 4 are graphs for explaining the theory of operation of each of the ferro-resonant paths of the flip-flop circuit shown in Fig. 2.

As shown in Fig. 2, the flip-flop circuit is comprised of path P*a* and path P*b*. Path P*a* includes an inductor $L_1$ in series with a capacitor $C_1$; and path P*b* includes an inductor $L_2$ in series with a capacitor $C_2$. The corresponding elements in each of these paths have the same values. The inductor ends of paths P*a* and P*b* are joined at junction 33 which is connected through a capacitor $C_3$ to a low impedance A. C. supply. An R. F. choke 35 provides a D. C. return to ground for junction 33. Inductors $L_1$ and $L_2$ are comprised of windings 36 and 37 about cores 38 and 39, respectively. These cores are preferably formed by rolling a thin sheet of ferromagnetic material into a tube having a length-to-diameter ratio on the order of 10 to 1.

Input trigger winding 40 is wound about the core 38 of inductor $L_1$, and a similar input trigger winding 41 is wound about the core 39 of inductor $L_2$. These trigger windings are connected in series to trigger input lead 42. Thus a signal applied on input lead 42 energizes both trigger windings simultaneously. An output lead 43 is connected to the common junction of capacitor $C_2$ and inductor $L_2$ of path P*b*, and an output lead 44 is similarly connected to path P*a*.

The output lead 43, for example, connected to path P*b*, includes a diode 45*b* and an inductive load in the form of control winding 47*b* of a magnetic amplifier 49*b*. The magnetic amplifier 49*b* serves as a buffer between the flip-flop and the load on output lead 48. A similar output circuit arrangement including diode 45*a* and control winding 47*a* of magnetic amplifier 49*a* is connected to the output lead 44 of path P*a*. This arrangement provides for a more balanced load on each path of the flip-flop, thus increasing the sensitivity and reliability of triggering of the flip-flop.

Each of the LC paths, P*a* and P*b*, of the flip-flops has an inherent bistable operation according to the principle of ferro-resonance. The bistability of path P*a*, for example, as connected between junction 33 and ground, can be explained by referring to Figs. 3 and 4. The iron core 38 of inductor $L_1$ causes the reactance $X_L$ of the inductor $L_1$ to vary as a function of current therethrough. The reactance $X_C$ of capacitor $C_1$, on the other hand, is fixed and its value is so chosen with relation to that of the inductor $L_1$ that the passing of a small amount of current through path P*a* results in the net reactance being inductive, as shown in Fig. 3. As more current is passed through the iron core inductor $L_1$, the inductive reactance of the current decreases until the point indicated $I_R$ is reached. A further increase of current causes the iron core to suffer A. C. saturation which results in a still further reduction of the effective inductive reactance of inductor $L_1$. This variation of net reactance with current can be shown to be regenerative for a predetermined operating voltage applied across the LC path such that the current can be made to jump between a stable operating point characterized by the net reactance being inductive, and a stable operating point characterized by the net reactance being slightly capacitive.

The jumping action of this circuit for a properly applied operating voltage is further explained by referring to the voltage-current curve shown in Fig. 4. As the A. C. voltage is increased, the voltage $E_{LC}$ across the LC path will first rise, reach a maximum, then decrease to a minimum at a current value $I_R$. A further increase of the current beyond $I_R$ causes the voltage $E_{LC}$ to again rise. It is to be noted that the slope 54 represents a negative reactance region wherein the circuit operation is unstable. But if the proper operating voltage is chosen and if the internal resistance of the circuit is relatively small, the LC path can be so operated that it will exhibit two possible stable values of $I_{AC}$, as shown in the graph of Fig. 4. Operating point M on the graph is characterized by low current and high inductive reactance; and operating point N is characterized by high current and a slightly capacitive reactance.

Referring again to the flip-flop circuit shown in Fig. 2, the reactance of the common impedance $C_3$ is chosen such that one and only one of paths P*a* and P*b* can be in the resonant or highly conductive condition at a time. If both paths should try to become resonant, the potential at junction 33 would fall so low owing to the voltage drop across capacitor $C_3$ that neither path P*a* nor path P*b* will have a sufficient potential across it to maintain resonance. On the other hand, if paths P*a* and P*b* should both try to become resonant, the potential at junction 33 would rise to such a value that one path or the other should be forced to break down and become resonant. The flip-flop circuit conduction status is sensed by means of the relative magnitude of A. C. voltage appearing on output lead 48. Thus when path P*b* is highly conductive, output lead 48 has a relatively high A. C. voltage thereon. This condition corresponds to a "zero" status of the flip-flop circuit. On the other hand, when path P*b* is in the low conducting state, output lead 48 has a relatively low A. C. voltage thereon. This condition corresponds to a "one" status of the flip-flop circuit. An indicator lamp 50 connected to path P*a* of each stage is lit whenever the flip-flop is in a "one" status.

It should be noted that the inductive loads provided at the output of paths P*a* and P*b* by the control windings 47*a* and 47*b* of buffer magnetic amplifiers 49*a* and 49*b*, respectively, function to increase the reliability of the triggering of the flip-flop circuit in response to successive trigger signals on the single input lead 42. For purposes of explanation, assume the flip-flop is initially operated such that path P*a* is highly conductive. Thus control winding 47*a* connected to path P*a* is initially drawing a relatively high rectified current while the similar control winding 47*b* connected to path P*b* is drawing a relatively low rectified current. The effect of a pulse applied to the trigger windings 40 and 41 via trigger input lead 42 is to nearly saturate inductor $L_2$, thus tending to drive path P*b* into a relatively high current condition resulting in a drop in potential at junction 33. As a result, the current in path P*a* starts to decrease. At the termination of the trigger pulse, the potential at junction 33 again increases owing to the fact that neither path P*a* nor P*b* is in resonance at this instant. The effect of this rising voltage will be to force either path P*a* or path P*b* into resonance. Since path P*a* and consequently control winding 47*a* were initially passing a relatively high current, while path P*b* and consequently control winding 47*b* were passing a relatively low current, the latter path offers the least impedance to the higher voltage at junction 33 which was effective thereon by the termination of the trigger pulse; and thus path P*b* is favored to go into resonance over path P*a*. In other words, the rectified current in the control winding 47*a* or 47*b* which is connected to the highly conductive path provides an inductive-kick as a result of the counter voltage action generated upon interrupting the current status of the flip-flop circuit paths by the trigger pulse. This inductive-kick persists after the trigger pulse is terminated, in accordance with the time constant of the output inductive circuit. This action effectively damps or loads the path which was previously in a high conducting status, thus favoring the other path to swing into resonance.

It is to be noted that the flip-flop can be manually reset to a zero status by utilization of reset push button 51. Normally push button 51 connects diode 45*a* to the control winding 47*a* of buffer magnetic amplifier 49*a*. However, when push button 51 is depressed, path P*a* is shorted to ground, thus causing path P*b* to become resonant if it is not already in that state; and the flip-flop thus attains its "zero" status.

Referring to the table in Fig. 5, it can be seen how the binary counter stages of the present invention as shown in Fig. 1 will change on receipt of successive input pulses C on common input lead 9, so that the status of the stages, in combination, uniquely represent successive counts of the counter. As previously noted, the count of the counter can be observed by the indicator lamps 50 connected to each of the flip-flops.

It is to be noted that the status of flip-flop A0, corresponding to stage $2^0$, alternates with each successive input pulse C; while flip-flop A1, corresponding to stage $2^1$, changes from the state it is in to the opposite state in response to an input pulse C, whenever stage $2^0$ is in a "one" state. Similarly, stage $2^2$ changes from the state it is in to the opposite state in response to an input pulse C, whenever both stages $2^1$ and $2^2$ are in a "one" state. Thus it is clear that the input gate G1 is controlled by the status of flip-flop A0, and input gate G2 is controlled by the status of flip-flops A0 and A1.

Reference will next be made to Fig. 6 showing a schematic diagram of gate circuit G2 as utilized in the binary counter circuit of Fig. 1. The positive D. C. potential source B+ may be 100 volts, for example. This potential is connected through limiting resistor 26 which may have a value of 100 thousand ohms, and shunt capacitor 27 having a value of 50 micro-micro farads, for example, to the anode-ends of parallel connected germanium crystal diodes $D_3$, $D_4$, and $D_5$. Diode $D_3$ has its cathode-end connected to output $A_1$ of flip-flop A1 which has an A. C. signal thereon having an amplitude swing of ±20 volts, or substantially 0 volts; while diode $D_4$ has its cathode-end connected to the output $G_1$ of gate G1 which has a D. C. voltage of either 0 volts or—20 volts; and finally, diode $D_5$ has its cathode-end connected to the common input lead 9 supplying negative pulses C of —20 volts amplitude. The coupling capacitor 30, having a value of 1000 micro-micro farads, for example, aids in controlling the rise and fall time of the voltage level at junction 24 between 0 and —20 volts.

The diode $D_3$ effectively rectifies the A. C. voltage swing between 0 to +20 v., and the shunt capacitor 27 is chosen so as to smooth out the ripples of the A. C. voltage swing (between 0 to —20 v.) at junction 24. Thus, whenever an A. C. voltage of ±20 v. appears on a diode input to a gate, its effect on the gate output can be considered the same as an applied voltage of —20 v. D. C. to a diode input. In order that an output waveform having the desired abrupt voltage drop is generated on gate output lead $G_2$, input leads 21 and 22 to gate G2 must both be at substantially the 0 volt level when a negative input pulse C is applied to input lead 23. The D. C. voltage level change at junction 24 is conveyed on gate output $G_2$ to the gate input of the following stage, while the steep negative-going wavefront is differentiated by capacitor 30, thus providing a sharp pulse 55 to the trigger input lead 31 of stage $2^2$.

Consider now how capacitor 30 permits only sharp drops in potential, i. e., the drop from 0 to —20 volts occasioned by the leading edge of negative input pulse C, to pass to stage $2^2$. The quantity RC, called the time constant of the circuit, is an index of the speed of response of the voltage at junction 24 to a change in applied potential. When conditions at the inputs of the gate cause the voltage level at junction 24 to rise, capacitor 30 is charged at a rate proportional to the large value of limiting resistor 26, times the value of capacitor 30. Similarly, when conditions at the inputs of the gate cause the voltage level at junction 24 to fall, capacitor 30 is discharged at a rate proportional to the small forward resistance of diode $D_5$, times the value of capacitor 30. Thus the RC time constant is seen to be relatively smaller in magnitude when the voltage level at junction 24 falls, causing this voltage level fall to be abrupt.

Thus a multi-diode input gating circuit has been described and shown, which will discriminate between a relatively high or a relatively low A. C. voltage and accordingly gate negative clock pulses only when the A. C. voltage applied on one input is relatively low, i. e., substantially at 0 volts, and the remaining gate inputs simultaneously are at a D. C. voltage level of 0 volts.

The counting circuit operation will now be described by reference to Fig. 7 showing a graph of the voltage waveforms with respect to time for various points in the circuits of Fig. 1. The clock pulse waveform C is shown with designations $t_1, t_2 \ldots t_6$ at the leading edge of each successive negative input pulse C, as an indication for the time of occurrence thereof. The other voltage waveforms appearing thereon are shown in timewise relationship to the clock pulses.

Assume an initial content of 000 in flip-flops A0, A1, and A2, respectively, of the counter. Thus there is a relatively high A. C. voltage having an amplitude of ±20 v. initially present on the output leads $A_0$, $A_1$, and $A_2$ of flip-flops A0, A1, and A2, respectively.

At time $t_1$, the first input pulse C is applied on common input lead 9. The effect of this pulse is to trigger flip-flop A0 to a "one" status, but this pulse C is not passed to the trigger input of either of the other stages because gates G1 and G2 are effectively closed. Thus, as a result of this action, the A. C. voltage on output $A_0$ is changed to an A. C. of substantially 0 volt; and the D. C. voltage on the output lead $G_1$ of gate G1 (Fig. 1) gradually rises from —20 volts to the 0 volt level at a rate proportional to the RC time constant of load resistor 15 and coupling capacitor 18. The voltages on outputs $A_1$ and $A_2$ of flip-flops A1 and A2, respectively, remain unchanged. These conditions are represented by the waveforms between $t_1$ and $t_2$ of Fig. 7.

At time $t_2$, the second input pulse C causes the flip-flop A0 to again be triggered into a "zero" status. In addition, since gate G1 is now, in effect, opened, the abrupt drop in voltage at junction 13 of gate G1, caused by the leading edge of second input pulse C, is differentiated by coupling capacitor 18 to produce a pulse that triggers flip-flop A1 to a "one" status. The drop in voltage level at junction 13 is also conveyed on gate output $G_1$ to the input of gate G2, thus maintaining this gate closed to the next input pulse C. The status of flip-flop A2, as represented by waveform $A_2$, is unchanged as yet. These conditions of the counter are represented by the waveforms shown between $t_2$ and $t_3$ in Fig. 7.

Upon application of the third input pulse C, at time $t_3$, flip-flop A0 is triggered to a "one" status, having a relatively low voltage on output $A_0$; while the voltage at junction 13, and consequently gate output $G_1$, gradually returns to 0 voltage level at a rate proportional to the RC time constant of the value of limiting resistor 15 times the value of coupling capacitor 18. Thus gate G1 will now be effectively opened to the next input pulse C. Since the voltage on output $A_1$ is still substantially 0 volt, gate output $G_2$ also rises to 0 volt. Thus gate G2 will likewise now be opened to the next input pulse C. These conditions are represented by the waveforms between $t_3$ and $t_4$ in Fig. 7.

At time $t_4$, inasmuch as gates G1 and G2 are now both open, the fourth input pulse C effectively triggers all three flip-flops to an opposite state as illustrated by the changes in waveforms $A_0$, $A_1$, and $A_2$ in Fig. 7, between $t_4$ and $t_5$. Thus the counter is triggered to a 001 status. As a result of this action, gates G1 and G2 are closed to the next input pulse C, and consequently the counter is triggered to a 101 status on the fifth input pulse C.

While the form of the invention shown and described herein is admirably adapted to fulfill the objects primarily stated, it is to be understood that it is not intended to confine the invention to the one form or embodiment disclosed herein, for it is susceptible of embodiment of various other forms.

What is claimed is:

1. A binary counting circuit or the like comprising a cascade of A. C. operated flip-flop circuits, each said circuit including a high and low current conducting path and a trigger input capable of reversing the status of said paths when energized; a source of trigger signals; a gating circuit coupled to the input of each said flip-flop circuits, each said gating circuit including a plurality of unidirectional elements, a limiting resistor and a shunt capacitor, said unidirectional elements having one end thereof connected, respectively, to the output of the previous flip-flop circuit, the trigger signal source, and the output of the gating circuit coupled to the input of the previous flip-flop circuit; and a source of D. C. potential connected through said limiting resistor to the other ends of said unidirectional elements for establishing a current through said limiting resistor in accordance with the lowest potential on the other ends of said unidirectional elements.

2. A binary counting circuit or the like comprising a series of A. C. operated flip-flop circuits, each said circuit having a relatively large or relatively small amplitude A. C. output potential and a single input capable of reversing the amplitude of the A. C. output potential when energized; a source of negative input pulses; a gating circuit coupled to the input of each said flip-flop circuit, each said gating circuit including three crystal diodes, a limiting resistor, and a filter capacitor shunting said limiting resistor, said crystal diodes connected, respectively, to the A. C. output of the previous flip-flop circuit, the source of negative input pulses, and the output of the gating circuit coupled to the input of the previous flip-flop circuit; and a positive D. C. potential connected through said limiting resistor to the other ends of said crystal diodes, whereby the output of a gating circuit abruptly changes from a high to low D. C. potential coincident with the leading edge of a negative input pulse when the outputs of the previous flip-flop circuits all have a relatively small amplitude A. C. potential thereon.

3. A binary counting circuit comprising a cascade of A. C. operated flip-flop circuit stages, each said stage including a pair of current conducting paths corresponding to a digit "one" and digit "zero," respectively, and a trigger input; a trigger signal source; a gating circuit coupled to the input of each said flip-flop circuit after the first stage, each said gating circuit comprised of a plurality of unidirectional elements, a limiting resistor, and a shunt capacitor, said unidirectional elements responsive to the A. C. signal on the path of the previous flip-flop circuit corresponding to the digit "zero," the trigger signal source, and the output of the gating circuit coupled to the input of the lower order flip-flop circuit stage; and a source of D. C. potential connected through said limiting resistor to said unidirectional elements, whereby each said gating circuit establishes an abrupt change of current through its limiting resistor in accordance with the fall of said trigger signal, when all the lower order stages are storing a digit "one."

4. A gating circuit comprising a plurality of unidirectional conductors; a source of A. C. potential having either a large or small amplitude connected to at least one of said unidirectional conductors; a source of square wave pulses having a value equal to either the rectified or the mean value of said A. C. potential connected to at least one of the remaining unidirectional conductors; a limiting resistor having an impedance value greater than that of said unidirectional conductors; a positive D. C. potential connected to the common junctions of said unidirectional conductors through said limiting resistor; a capacitor shunting said limiting resistor for filtering the A. C. ripple on said common junction; and a coupling capacitor connected to said common junction, whereby the potential at said common junction changes in accordance with the leading edge of said square wave pulse when the A. C. potential has a small amplitude.

5. A gating circuit comprising a plurality of unidirectional conductors; a source of A. C. potential having either a large or small amplitude connected to at least one of said unidirectional conductors; a source of D. C. potential having a value equal to either the negative value or the mean value of said A. C. potential connected to at least one of the remaining unidirectional conductors; a source of negative input pulses having either the high or low potential level of said D. C. potential connected to one of said unidirectional conductors; a limiting resistor having a value greater than the resistance of said unidirectional conductors; a positive D. C. potential connected to the common junctions of said unidirectional conductors through said limiting resistor; a filter capacitor shunting said limiting resistor; and a coupling capacitor connected to said common junction, whereby the potential at said common junction drops sharply from said high to low D. C. potential level in accordance with the leading edge of a negative input pulse when the source of D. C. potential level is high and the A. C. potential has a small amplitude.

6. A gating circuit comprising a plurality of parallel connected unidirectional conductors connected to a common junction; a source of A. C. potential having either a large or small value amplitude connected to the input of at least one of said unidirectional conductors; a D. C. potential source having a potential equal to either the negative value or the mean value of said A. C. potential connected to the input of at least one of the remaining unidirectional conductors; a source of negative input pulses having either the relatively high or relatively low potential level of said D. C. potential source connected to the input of one of said unidirectional conductors; a limiting resistor having a value greater than the resistance of said unidirectional conductors; a filter capacitor shunting said limiting resistor; a positive D. C. potential connected to the common junction of said unidirectional conductors through said limiting resistor; and a coupling capacitor connected to the common junction of said unidirectional conductors, whereby the potential at said common junction drops sharply from said relatively high to relatively low D. C. potential level in accordance with the leading edge of a negative input pulse when the A. C. potential is of a small value amplitude, and the D. C. potential is equal to the mean value of said A. C. potential.

References Cited in the file of this patent

UNITED STATES PATENTS 2,697,178 Isborn ---------------- Dec. 14, 1954